United States Patent Office 3,743,635
Patented July 3, 1973

3,743,635
27-DEMETHOXY-27-HYDROXYRIFAMYCIN
DERIVATIVES
Carlo Hengeller, Naples, Giancarlo Lancini, Pavia, and Piero Sensi, Milan, Italy, assignors to Gruppo Lepetit S.p.A., Milan, Italy
No Drawing. Filed July 17, 1970, Ser. No. 55,956
Claims priority, application Italy, July 29, 1969, 20,216/69
Int. Cl. C07d 41/00
U.S. Cl. 260—239.3 P
3 Claims

ABSTRACT OF THE DISCLOSURE

Antibiotic substances of the rifamycin family, namely species of 27-demethoxy-27-hydroxyrifamycin, are produced by cultivating a mutant of *Streptomyces mediterranei* in an aqueous nturient media and isolating the antibiotics from the fermentation medium by extraction. The antibiotics exhibit antibacterial activity, particularly against various Gram negative bacteria.

BRIEF SUMMARY OF THE INVENTION

The present invention relates to antibiotics and particularly is directed to new antibiotics of the refamycin family, 27 - demethoxy - 27 - hydroxyrifamycin SV, 27-demethoxy-27-hydroxyrifamycin B, and 25-desacetyl-27-demethoxy-27-hydroxyrifamycin, and to a process for their preparation by fermenting some mutants of *Streptomyces mediterranei* which have the property of producing directly in the broth of the cited antibiotics.

The antibiotic substances, hereinafter all referred to at times as 27-demethoxy-27-hydroxyrifamycin, are solids having characteristic properties such as infrared absorption spectra, melting points and ultraviolet absorption spectra as set out in greater detail hereinafter.

The 27 - demethoxy - 27-hydroxyrifamycin producing strain has been obtained from a culture of *Streptomyces mediterranei* producer of rifamycin B, after mutagenic treatment with N - methyl - N - nitro-N-nitrosoguanidine. The colonies surviving the mutagenic treatment were isolated, tested in fermentation flasks and checks for the ability of the culture to inhibit the growth of *Pseudomonas reptilivora* NRRL–B–6 cultivated on Penassay seed agar at pH 7.2. Under these conditions rifamycin B is microbiologically inactive and 27-demethoxy-27-hydroxyrifamycin producing strains could be isolated. One of these new mutants, which had been found to be particularly effective in producing high yields of the species 27-demethoxy-27-hydroxyrifamycin received the internal code number S–995. The strain has been deposited with the ATCC and received the serial number 21411.

In the actual preparation of 27-demethoxy-27-hydroxyrifamycin, the organism *Streptomyces mediterranei* S–955 (ATCC 21411) is cultivated under aerobic conditions in an aqueous nutrient medium suitable for the growth of said organism, the medium containing a source of carbon, source of nitrogen and inorganic salts. Cultivation is continued under conditions conducive to the growth of said organism for a time sufficient for the production of said 27 - demethoxy - 27 - hydroxyrifamycin, as indicated, for example by substantial antibiotic activity of the fermentation medium against Gram negative bacteria. The 27-demethoxy-27-hydroxyrifamycin thus produced can be isolated by conventional procedures such as removal of mycelium by centrifugation followed by extraction, typically with an organic liquid in which 27-demethoxy-27-hydroxyrifamycin is soluble and which is immiscible with the aqueous medium.

The antibiotic substance of the invention is useful as an antibiotic, particularly against Gram negative bacteria. Thus 27-demethoxy-27-hydroxyrifamycin can be employed in controlling such microorganisms in conventional procedures, such as by application of an antimicrobial amount of the antibiotic or a composition containing the same to Gram negative bacteria, or to substrates susceptible to attack by such organisms. In addition, antimicrobial amounts of the antibiotic substance of the invention can be administered to animals by conventional procedures in combatting Gram negative bacteria attacking said animals. 27-demethoxy-27-hydroxyrifamycin can, for example be employed prophylactically, by internal administration to mammals susceptible to infection by Gram negative bacteria, or therapeutically, by internal administration to infected animals. The strain S–955 (ATCC 21411), on the usual classic media utilized for the streptomyces genus growth, maintains the original taxonomy of *Streptomyces mediterranei*. Only some differences are noted, the most important of which are (1) the absence of aerial hyphae and conidia and (2) different soluble pigment color. Cultural characteristics on various media are shown in Table 1 in comparison with the *Streptomyces mediterranei* strain ATCC 13685, producer of rifamycin B.

TABLE 1
Comparative cultural characteristics of *streptomyces mediterranei*—ATCC 13685 and strain S-955 (ATCC 21411)

| | ATCC 13685 | | | S-955 (ATCC 21411) | | |
|---|---|---|---|---|---|---|
| | Vegetative mycelium | Aerial mycelium | Soluble pigment | Vegetative mycelium | Aerial mycelium | Soluble pigment |
| Starch agar | Hyaline to light brown. | Pinkish white | Green-yellow to light brown. | Yellow brown to brown. | Absent | Dark brown. |
| Ca malate glucose agar | do | do | Light, yellow | Orange to orange brown. | do | Orange brown. |
| Ca malate glycerol agar | do | White, light orange | Scarce, pale orange | Orange brown | do | Light orange brown. |
| Bennett agar | Hyaline to orange yellow. | Pinkish white | Very light yellow brown. | Yellow brown to red brown. | do | Red pale. |

The media named in the above table had the following compositions:

Starch agar.—Soluble starch 10 g. (grams), $KH_2PO_4$ 1 g., $MgSO_4 \cdot 7H_2O$ 1 g., NaCl 1 g., $(NH_4)_2SO_4$ 2 g., $FeSO_4 \cdot 7H_2O$, $MnCl_2 \cdot 4H_2O$, $ZnSO_4 \cdot 7H_2O$ each 0.001 g., agar Difco 20 g., dist. water to 1000 milliliters. After sterilization at 120° C. for 20 minutes, pH 6.7–6.8.

Ca Malate glucose agar.—Glucose 20 g., Ca malate 10 g., $NH_4Cl$ 0.5 g., $K_2HPO_4$ 0.5 g., agar Difco 15 g., dist. water to 1000 milliliters. After sterilization at 115° C. for 15 minutes, pH 6.5.

Ca malate glycerol agar.—Glycerol 10 g., Ca malate 10 g., $NH_4Cl$ 0.5 g., $KH_2PO_4$ 0.5 g., agar Difco 15 g., dist. water to 1000 milliliters. After sterilization at 115° C. for 15 minutes, pH 6.5–6.6.

Bennett agar.—Glucose 10 g., yeast extract 1 g., beef extract 1 g., N-Z-amine A 2 g., agar 15 g., dist. water to 1000 milliliters. After sterilization at 120° C. for 20 minutes, pH 6.7–6.8.

DETAILED DESCRIPTION OF THE INVENTION

The actual procedure employed to prepare the new 27-demethoxy-27-hydroxyrifamycin consists in cultivating *Streptomyces mediterranei* S–955 (ATCC 21411) in a nutrient medium containing assimilable carbon and nitrogen sources and essential mineral salts, until a substantial antibiotic activity is imparted to said medium and in extracting 27-demethoxy-27-hydroxyrifamycin from the medium. More particularly the mutant is cultivated under stirred and aerated submerged conditions at a temperature ranging from 24 to 32° C., and preferably at 28° C. As sources of carbon the following carbohydrates and carbon derivatives can be used: glucose, galactose, lactose, sucrose, maltose, glycerol, mannitol, etc. Useful nitrogen sources are for instance amino-acids and their mixtures, peptides, proteins and their hydrolysates such as peptone, yeast extract, peanut meal, soybean meal, corn steep liquor, fish solubles, meat extract, and aqueous fractions from cereal seeds. The fermentation can be carried out for 12–180 hours. The starting pH, generally about 6.4, decreases during the course of the fermentation to 5.5–5.8. Generally the best results are observed after 150–160 hours of fermentation. After this time an excellent yield, particularly of the specie, 27-demethoxy-27-hydroxyrifamycin SV, is obtained. At the end of the fermentation 27-demethoxy-27-hydroxyrifamycin can be isolated by the following procedure. The fermentation medium is filtered at the pH of from about 6.2–8.4. The filtrate is acidified to pH between about 1 to 5 and extracted with a solvent exhibiting a low solubility in water such as, for example, ethyl acetate, butyl acetate, butanol, and chloroform. The solution is successively evaporated to a small volume and products are precipitated by the addition of hexane, heptane or other aliphatic hydrocarbons as petroleum ether, ligroin and the like. The resulting product can be fractionated with usual techniques among which the most preferable are: chromatography on silica gel column eluting with a mixture of acetone and chloroform, or Sephadex chromatography eluting with aqueous solution buffered to pH from 4 to 7 or counter-current distribution. For the last fractionation method a suitable system of solvents is a phosphate buffer (pH 5.5 to 7.0) as stationary phase and ethyl acetate as mobile phase. After fractionation and purification the following products are identified: 27-demethoxy-27-hydroxyrifamycin SV, 27-demethoxy-27-hydroxyrifamycin B, and 25-desacetyl-27-demethoxy-27-hydroxyrifamycin SV. The characteristics of the products are given in detail in Example 1 which follows, where a process for their isolation is indicated.

To the purpose of better illustrating the subject of the invention the following examples are given:

EXAMPLE 1

The strain S–955 (ATCC 21411) is propagated for 6–8 days on Bennett's agar and incubated at 28° C. with the culture obtained from the agar slant; two 500 milliliter Erlenmeyer flasks are inoculated under sterile conditions. The flasks contain 100 milliliters of the vegetative medium of the following composition:

|  | Grams |
|---|---|
| Beef extract | 5 |
| Yeast extract | 5 |
| Peptone | 5 |
| Casein hydrolyzate | 3 |
| Glucose | 20 |
| NaCl | 1.5 |
| $H_2O$ (tap) to 1 l. (liter). | |

The pH is adjusted to 7.3 with NaOH. After sterilization (20 minutes to 120° C.) the pH is 6.6–6.8. The flasks so inoculated are placed on an alternating shaker at 28° C. for 72 hours. For the preculture the contents are poured into a 10 liter glass fermenter, containing 4 liters of medium having the following compositions:

| | | |
|---|---|---|
| Glucose | g | 5 |
| Corn steep liquor | g | 15 |
| $CaCO_3$ | g | 1.65 |
| $MgSO_4 \cdot 7H_2O$ | g | 0.33 |
| $KH_2PO_4$ | g | 0.33 |
| $FeSO_4 \cdot H_2O$ | mg. (milligrams) | 3.3 |
| $ZnSO_4 \cdot 7H_2O$ | mg | 16.5 |
| $MnSO_4 \cdot 4H_2O$ | mg | 1.3 |
| $H_2O$ (tap) to 1 l. (liter). | | |

The medium with the pH adjusted to 7.5 is sterilized 50 minutes at 120° C. After sterilization the pH value is 6.4. The culture is incubated at 28° C. with a 750 revolutions per minute (r.p.m.) agitation and aerated at a rate of 1 volume air/volume culture/minute (v./v./m.). Silicone A is used as antifoam. After 38 hours of growth the volume of packed cells is 6–8% of the total volume. An inoculum equal to 10% is used for a 10 liter glass fermenter, containing 4 liters of fermentation medium having the following compositions:

| | | |
|---|---|---|
| Corn steep liquor | g | 35 |
| $(NH_4)_2SO_4$ | g | 9.5 |
| $MgSO_4 \cdot 7H_2O$ | g | 0.85 |
| Glucose | g | 100 |
| Na-diethylbarbiturate | g | 1.5 |
| $CaCO_3$ | g | 9.5 |
| $FeSO_4 \cdot 7H_2O$ | mg | 8.5 |
| $ZnSO_4 \cdot 7H_2O$ | mg | 42.5 |
| $MnSO_4 \cdot 4H_2O$ | mg | 3.4 |
| $CuSO_4 \cdot 5H_2O$ | mg | 2.8 |
| $CoCl_2 \cdot 6H_2O$ | mg | 1.7 |
| $H_2O$ (tap) to 1 l. | | |

The pH is adjusted to 7.8 with NaOH and the medium sterilized 50 minutes at 120° C. After sterilization the pH is 6.3–6.4. The fermentation is carried out at 28° C. with 750 r.p.m. agitation and aerating at a rate of 1 v./v./m. for 160 hours. At the harvest the pH of the fermentation broth is 6.4 and the amount of 27-demethoxy-27-hydroxyrifamycin SV is 1000 micrograms/milliliter (γ/ml.). To the fermentation broth (volume about 4 liters (l.)) 8 grams of sodium ascorbate are added in order to maintain antibiotics in their reduced form, and sodium hydroxide in a quantity sufficient to bring the pH to a value of 7.5. The broth is then filtered in vacuo adding filter aids. The mycelium is washed with water. Both the filtrate and washing are extracted after acidification to pH 2.5 twice with 4 liters of ethyl acetate. The combined extracts are concentrated in vacuo to a final volume of about 300 ml. By cooling the solution, colored impurities precipitate which are eliminated by filtration. The clear solution is further concentrated in vacuo to about 100 ml. and poured into 1 liter of petroleum ether. After filtration and drying, a yellow precipitate of 7 grams is obtained. The product is dissolved in the first tubes of a Craig apparatus and fractionated by counter-current distribution using a stationary phase a solution M/15 of phosphate buffers pH 6.5 containing 1% of sodium ascorbate, and as mobile phase ethyl acetate. After 290 transfers, the spectrophotometric and chromatographic analysis reveals the presence of 25-desacetyl-27-demethoxy-27-hydroxyrifamycin SV and 27-demethoxy-27-hydroxyrifamycin B in the tubes from 20 to 50. The content of tubes 70–100 is combined, the aqueous phase acidified to pH 2.5 and the product extracted in ethyl acetate. The organic phases and the extracts combined are washed with water, concentrated in vacuo to 30 ml. and poured into petroleum ether. A precipitate of 2.5 g. of 27-demethoxy-27-hydroxyrifamycin SV is obtained. The content of the tubes 20-50 is combined and the products are extracted and precipitated as above mentioned. A mixture, about 1 g., is put on a column of 100 g. of Sephadex G. 25 and eluted with phosphate buffer M/15 pH 6.5. The obtained fractions from the column are analyzed by thin layer chromatography. The first 100 ml. of eluate are discarded. The following 120 ml. are collected, containing 27-demethoxy-27--hydroxyrifamycin B that is extracted in ethyl acetate after acidification of the buffer, and obtained by the solvent concentration from which it crystallizes. Three hundred mg. of product are obtained. From the subsequent fraction, 25-desacetyl-27-demethoxy-27-hydroxyrifamycin SV is obtained by the extraction in ethyl acetate at an acidic pH, concentration of the solvent and precipitation in petroleum ether. The dried precipitate weighs 200 mg. The properties of the three compounds as determined by analysis are the following:

27-demethoxy-27-hydroxyrifamycin B

*Elemental analysis.*—Calcd. for $C_{38}H_{47}NO_{14}$ (percent): C, 61.5; H, 6.38; N, 1.88. Found (percent): C, 61.06; H, 6.08; N, 2.06.

Melting point: the product becomes brown at 240° C. but remains solid; i.e. does not melt, up to a temperature of 300° C.

Infrared absorption spectra (in Nujol)—Principal bands cm.$^{-1}$: 3400, 2900 (n.), 2830 (n.), 1725, 1650, 1580, 1550, 1530, 1462 (n.), 1375 (n.), 1315, 1260, 1205, 1170, 1095, 1070, 1045, 975, 947, 913, 860, 795, 720.

Ultraviolet absorption spectra (in buffer pH 7.38) shows the following maxima:

$$\lambda max.=423 \; m\mu \; E_{1\,cm.}^{1\%}=215$$

$$\lambda max.=302 \; m\mu \; E_{1\,cm.}^{1\%}=269$$

27-demethoxy-27-hydroxyrifamycin SV

*Elemental analysis.*—Calcd. for $C_{36}H_{45}NO_{12} \cdot H_2O$ (percent): C, 61.6; H, 6.7; N, 2.0. Found (percent): C, 61.1; H, 6.7; N, 2.2.

$H_2O$ (Vidal Fisher) calculated 2.5%; found 2.09%.

Melting point: the product decomposes at 160° C.

Infrared absorption spectra (in Nujol)—Principal bands cm.$^{-1}$: 3450, 2900 (n.), 2830 (n.), 1720, 1660, 1600, 1550, 1462 (n.), 1375 (n.), 1325, 1290, 1260, 1220, 1155, 1095, 1050, 1020, 970, 947, 920, 897, 845, 802, 788.

Ultraviolet absorption spectra (in buffer pH 7.38) shows the following maxima:

$$\lambda max.=445 \; m\mu \; E_{1\,cm.}^{1\%}=200$$

$$\lambda max.=313 \; m\mu \; E_{1\,cm.}^{1\%}=325$$

pKa (spectrophotometrically determined in solution $H_2O$-MeOH 95:5) =1.5.

25-desacetyl-27-demethoxy-27-hydroxyrifamycin SV

*Elemental analysis.*—Calcd. for $C_{34}O_{11}N$, (percent): C, 63.6; H, 6.75; N, 2.18. Found (percent): C, 63.11; H, 6.5; N, 2.23.

Melting point: decomposes at 170° C.

Infrared absorption spectra (in Nujol)—Principal bands cm.$^{-1}$: 3400, 2900 (n.), 2830 (n.), 1730, 1645, 1605, 1550, 1500, 1462 (n.), 1410, 1375 (n.), 1320, 1265, 1220, 1200, 1167, 1110, 1080, 1060, 1010, 977, 947, 920, 895, 825, 800.

Ultraviolet absorption spectra (in buffer pH 7.38) shows the following maxima:

$$\lambda max.=440 \; m\mu \; E_{1\,cm.}^{1\%}=210$$

$$\lambda max.=311 \; m\mu \; E_{1\,cm.}^{1\%}=335$$

EXAMPLE 2

A culture of *Steptomyces mediterranei* S-955, obtained as disclosed in Example 1, is prepared in a flask, under stirring, as described in Example 1. The content of the flask is used as inoculum by pouring it in a 10 liter prefermenter, containing 4 liters of the vegetative medium set forth in Example 1. The incubation is carried out at 28° C. with an agitation of 750 r.p.m. and 1 v./v./m. aeration. After 30 hours of growth a volume of 7–10% of packed cells was obtained.

In the next stage of 10 liter glass fermenter containing 4 liters of the hereinafter mentioned medium is used:

| | | |
|---|---|---|
| Peanut flour | grams | 25 |
| Soybean flour | do | 5 |
| $(NH_4)_2SO_4$ | do | 9.5 |
| $MgSO_4 \cdot 7H_2O$ | do | 0.85 |
| Glucose | do | 95 |
| Glycerol | *do* | 40 |
| $KH_2PO_4$ | do | 1 |
| Propylene glycol | do | 5 |
| $CaCO_3$ | do | 8.5 |
| Na diethylbarbiturate | do | 1.7 |
| $CuSO_4 \cdot 5H_2O$ | milligrams | 2.8 |
| $FeSO_4 \cdot 7H_2O$ | do | 8.5 |
| $ZnSO_4 \cdot 7H_2O$ | do | 42.5 |
| $MnSO_4 \cdot 4H_2O$ | do | 3.4 |
| $CoCl_2 \cdot 6H_2O$ | do | 1.7 |
| $(NH_4)_6Mo_7O_{24} \cdot 4H_2O$ | do | 0.85 |
| $H_2O$ (tap) to 1 liter. | | |

The medium with the pH adjusted to 7.8 with NaOH is sterilized for 60 minutes at 120° C. After sterilization the pH is 6.3–6.4. An amount of the prefermenter content equal to 5% is used as inoculum. The fermentation is carried out at 28° C. with a 750 r.p.m. agitation and aerating at a rate of 1 v./v./m. Silicone A is used as antifoam. The culture broth turns to a characteristic brown red dark color during the fermentation. After about 160 hours of growth a volume of 20–25% of packed cells is obtained, the pH of the broth-culture is 6.2 and the highest antibiotic activity is reached (1500–1800 $\gamma$/ml. of 27-demethoxy-27-hydroxyrifamycin SV). At this time the broth is harvested.

The new 27-demethoxy-27-hydroxyrifamycin product of the present invention exhibits a good antibiotic activity which is particularly effective against certain gram negative bacteria. In a representative operation, for example, 27-demethoxy-27-hydroxyrifamycin SV was found to be active against *Fusibacterium fusiforme I.S.S.* at a minimum inhibitory concentration of 0.05 microgram per milliliter ($\gamma$/ml.).

What is claimed is:

1. The antibiotic substance, 27-demethoxy-27-hydroxyrifamycin SV, melting with decomposition at 160° C.; having ultraviolet absorption spectra with the following maxima: in pH 7.38 buffer solution, $$445 \; m\mu \; (E_{1\,cm.}^{1\%}=200), \; 313 \; m\mu \; (E_{1\,cm.}^{1\%}=325)$$

having an acid group with pKa 1.5; having infrared absorption spectra in Nujol with maxima at the following wavelengths expressed in cm.$^{-1}$: 3450, 2900, 2830, 1720, 1660, 1600, 1550, 1462, 1375, 1325, 1290, 1260, 1220, 1155, 1095, 1050, 1020, 970, 947, 920, 897, 845, 802, 788; containing the elements carbon hydrogen, and nitrogen in substantially the following proportions by weight; carbon 61.1 percent, hydrogen 6.7 percent and nitrogen 2.2 percent.

2. The antibiotic substance, 27-demthoxy-27-hydroxyrifamycin B, becoming brown at 240° C. but remaining solid up to 300° C.; having ultraviolet absorption spectra with the following maxima: in pH 7.38 buffer solution, $$423 \; m\mu \; (E_{1\,cm.}^{1\%}=215), \; 302 \; m\mu \; (E_{1\,cm.}^{1\%}=269)$$

having infrared absorption spectra in Nujol with maxima at the following wavelengths expressed in cm.$^{-1}$: 3400, 2900, 2830, 1725, 1650, 1580, 1550, 1530, 1462, 1375, 1315, 1260, 1205, 1170, 1095, 1070, 1045, 975, 947, 913, 860, 795, 720; containing the elements carbon, hydrogen, and nitrogen in substantially the following proportions by weight; carbon 61 percent, hydrogen 6 percent and nitrogen 2 percent.

3. The antibiotic substance, 25-desacetyl-27-demethoxy-27-hydroxyrifamycin SV, melting with decomposition at 170° C.; having ultraviolet absorption spectra with the following maxima: in pH 7.38 buffer solution, 440 m$\mu$ ($E_{1cm.}^{1\%}$=210), 311 m$\mu$ ($E_{1cm.}^{1\%}$=335)

having infrared absorption spectra in Nujol with maxima at the following wavelengths expressed in cm.$^{-1}$: 3400, 2900, 2830, 1730, 1645, 1605, 1550, 1500, 1462, 1410, 1375, 1320, 1265, 1220 1200, 1167, 1110, 1080, 1060, 1010, 977, 947, 920, 895, 825, 800; containing the elements carbon, hydrogen, and nitrogen in substantially the following proportions by weight: carbon 63 percent, hydrogen 6.5 percent and nitrogen 2.2 percent.

References Cited

UNITED STATES PATENTS

| | | | |
|---|---|---|---|
| 3,524,845 | 8/1970 | Bickel et al. | 260—210 AB |
| 3,625,961 | 12/1971 | Maggi | 260—239.3 P |
| 3,644,337 | 2/1972 | Bickel et al. | 260—239.3 P |

OTHER REFERENCES

Lancini et al., "The Journal of Antibiotics," vol. XXII, No. 8, 1969, pp. 369–372 and 376.

LEWIS GOTTS, Primary Examiner

J. R. BROWN, Assistant Examiner

U.S. Cl. X.R.

195—80; 424—121